US012324978B2

(12) United States Patent
Doerksen et al.

(10) Patent No.: US 12,324,978 B2
(45) Date of Patent: *Jun. 10, 2025

(54) SUSPENSION SYSTEMS FOR AN ELECTRIC SKATEBOARD

(71) Applicant: Future Motion, Inc., Santa Cruz, CA (US)

(72) Inventors: Kyle Jonathan Doerksen, Santa Cruz, CA (US); Maximilian Fredrick Ballenger Sluiter, Oak Park, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,847

(22) Filed: May 31, 2024

(65) Prior Publication Data
US 2024/0316439 A1 Sep. 26, 2024

Related U.S. Application Data

(63) Continuation of application No. 18/248,214, filed as application No. PCT/US2021/050463 on Sep. 15, 2021, which is a continuation of application No. 17/474,858, filed on Sep. 14, 2021, now Pat. No. 11,484,776, and a continuation of application No. 17/229,572, filed on Apr. 13, 2021, now Pat. No. 11,123,629.

(60) Provisional application No. 63/088,192, filed on Oct. 6, 2020.

(51) Int. Cl.
A63C 17/12 (2006.01)
A63C 17/00 (2006.01)
A63C 17/08 (2006.01)
B62K 11/00 (2006.01)

(52) U.S. Cl.
CPC .......... *A63C 17/12* (2013.01); *A63C 17/0046* (2013.01); *A63C 17/08* (2013.01); *B62K 11/007* (2016.11); *A63C 2203/12* (2013.01); *A63C 2203/20* (2013.01); *A63C 2203/42* (2013.01)

(58) Field of Classification Search
CPC ..... A63C 17/12; A63C 17/0046; A63C 17/08; A63C 2203/12; A63C 2203/20; B62K 11/007
See application file for complete search history.

(56) References Cited

U.S. PATENT DOCUMENTS

| | | | | |
|---|---|---|---|---|
| 9,962,597 B2 * | 5/2018 | Doerksen | .............. | B62K 25/00 |
| 10,010,784 B1 * | 7/2018 | Doerksen | .............. | B62D 51/02 |
| 11,123,629 B1 * | 9/2021 | Doerksen | .............. | A63C 17/08 |
| 11,484,776 B2 * | 11/2022 | Doerksen | .......... | A63C 17/0046 |
| 12,005,340 B2 * | 6/2024 | Doerksen | .......... | A63C 17/0046 |
| 2017/0120139 A1 * | 5/2017 | Ma | ..................... | A63C 17/0046 |

* cited by examiner

*Primary Examiner* — Brian L Swenson
(74) *Attorney, Agent, or Firm* — Kolitch Romano Dascenzo Gates LLC

(57) ABSTRACT

A self-propelled, one-wheeled vehicle may include a suspension system configured to dampen up and down motion of a board relative to the axle of a central wheel assembly when the vehicle encounters obstacles and bumps on a riding surface. Illustrative suspension systems include a shock absorber, a rocker, a pushrod, bell cranks, and/or a swingarm that couple the axle to the board. The suspension system may be disposed completely below a foot deck of the vehicle.

20 Claims, 10 Drawing Sheets

SUSPENSION SYSTEMS FOR AN ELECTRIC SKATEBOARD

CROSS-REFERENCES

The following applications and materials are incorporated herein, in their entireties, for all purposes: U.S. Pat. Nos. 9,101,817; 9,452,345; 9,598,141; and U.S. Provisional Pat. Application No. 63/088,192, filed Oct. 6, 2020.

FIELD

This disclosure relates to systems and methods for isolating a vehicle frame from certain effects of uneven terrain. More specifically, the disclosed embodiments relate to suspension systems for one-wheeled vehicles.

SUMMARY

The present disclosure provides systems, apparatuses, and methods relating to suspension systems for self-propelled one-wheeled vehicles.

In some embodiments, a suspension system for a self-balancing electric vehicle includes: a swingarm coupling an axle of a wheel of the self-balancing electric vehicle to a frame of the self-balancing electric vehicle, such that the frame is configured to be movable up and down relative to the axle; and a shock absorber oriented transverse to the direction of travel of the self-balancing electric vehicle and coupled at each end to the swingarm, such that the shock absorber is configured to dampen up and down movement of the frame relative to the axle; wherein an entirety of the shock absorber is disposed below a foot-receiving deck portion of the self-balancing electric vehicle.

In some embodiments, a method of operating a self-balancing electric vehicle includes: damping up and down movement of a frame of the self-balancing electric vehicle relative to an axle of the self-balancing electric vehicle using a suspension system coupling the axle to the frame, wherein the suspension system includes a shock absorber oriented transverse to a direction of travel, and wherein an entirety of the shock absorber is disposed below a foot-receiving deck portion of the electric vehicle.

In some embodiments, a suspension system for a self-balancing electric vehicle includes: a swingarm coupling an axle of the self-balancing electric vehicle to a frame of the self-balancing electric vehicle, such that the frame is movable up and down relative to the axle; and a shock absorber oriented transverse to the direction of travel of the self-balancing electric vehicle, such that the shock absorber is configured to dampen up and down movement of the frame relative to the axle; wherein an entirety of the shock absorber is disposed below a foot-receiving deck portion of the self-balancing electric vehicle.

Features, functions, and advantages may be achieved independently in various embodiments of the present disclosure, or may be combined in yet other embodiments, further details of which can be seen with reference to the following description and drawings.

DETAILED DESCRIPTION

Figure 1:
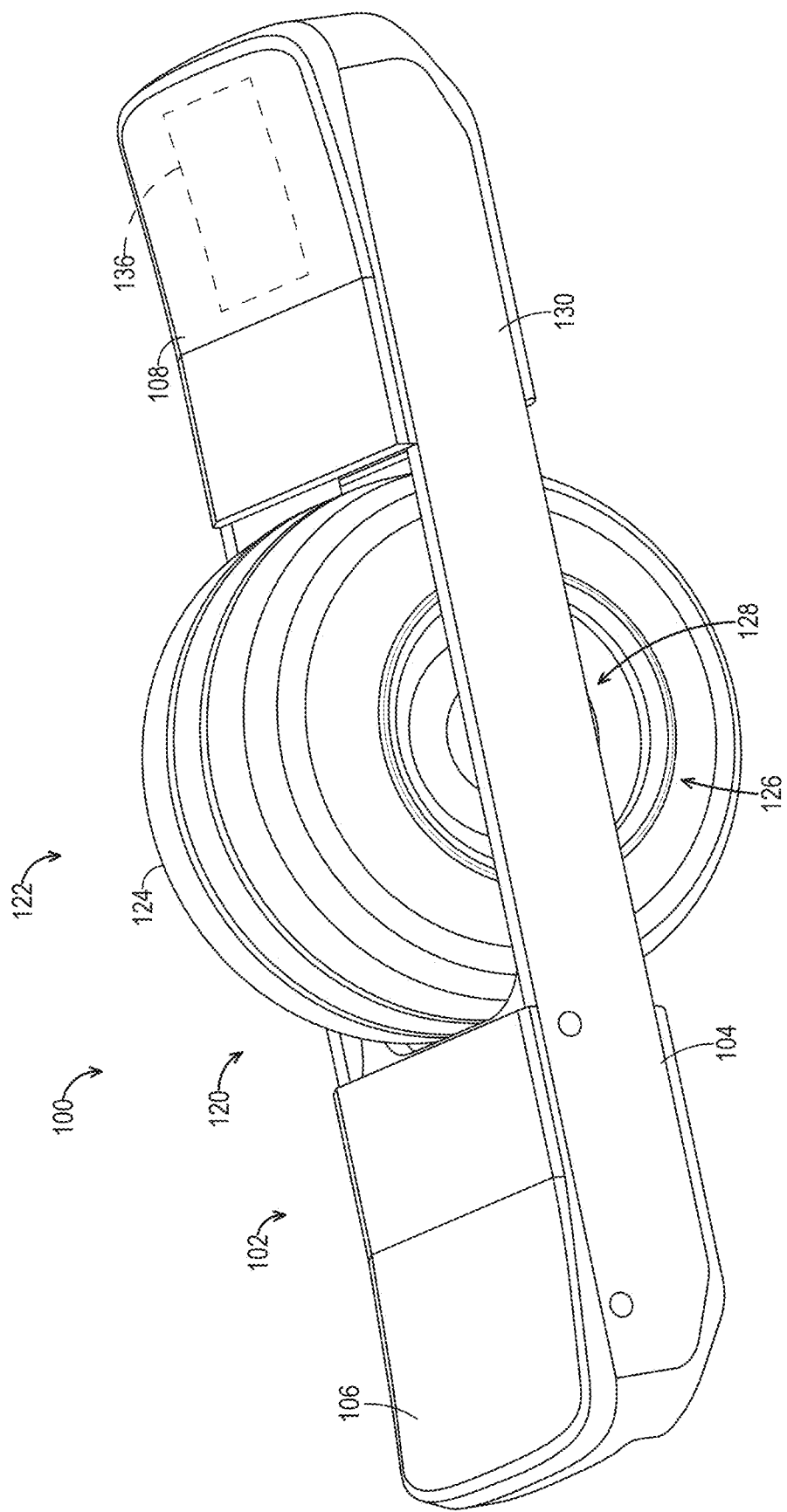
FIG. 1 is an isometric view of a one-wheeled vehicle in accordance with aspects of the present disclosure.

Various aspects and examples of swingarm suspension systems for one-wheeled vehicles, as well as related methods, are described below and illustrated in the associated drawings. Unless otherwise specified, a one-wheeled vehicle having a swingarm suspension system, and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, suspension systems according to the present teachings are configured to be utilized with one-wheeled electric vehicles. One-wheeled electric vehicles of the present disclosure are self-stabilizing skateboards substantially similar in non-suspension aspects to the electric vehicles described in U.S. Pat. No. 9,101,817 (the '817 patent). Accordingly, one-wheeled vehicles of the present disclosure include a board defining a riding plane and a frame supporting a first deck portion and a second deck portion (collectively referred to as the foot deck). Each deck portion is configured to receive a left or right foot of a rider oriented generally perpendicular to a direction of travel of the board.

One-wheeled vehicles of the present disclosure include a wheel assembly having a rotatable, ground-contacting element (e.g., a tire, wheel, or continuous track) disposed between and extending above the first and second deck portions. The wheel assembly further includes a hub motor configured to rotate the ground-contacting element to propel the vehicle.

As described in the '817 patent, the one-wheeled vehicle includes at least one sensor configured to measure orientation information of the board, and a motor controller configured to receive orientation information measured by the sensor and to cause the hub motor to propel the vehicle based on the orientation information.

The frame may include any suitable structure configured to rigidly support the deck portions and to be coupled to an axle of the wheel assembly, such that the weight of a rider may be supported on the tiltable board, having a fulcrum at the wheel assembly axle. The frame includes one or more frame members on which the deck portions are mounted. The frame may support one or more additional elements and features of the vehicle, e.g., a charging port, end bumpers, lighting assemblies, battery and electrical systems, electronics, controllers, etc.

The deck portions may include any suitable structures configured to support the feet of a rider, such as non-skid surfaces, as well as vehicle-control features, such as a rider detection system. Illustrative deck portions, including suitable rider detection systems, are described in the '817 patent, as well as in U.S. Pat. No. 9,352,245.

A shaft of the hub motor is coupled to the frame by a suspension system. The suspension system is a swingarm-type suspension, having a swingarm dampened by a damper or shock absorber (e.g., a gas spring).

As mentioned above, the hub motor is controlled by a motor controller configured to receive orientation information regarding the board. Aspects of the electrical control systems described herein (e.g., the motor controller) may be embodied as a computer method, computer system, or computer program product. Accordingly, aspects of the present control systems may include processing logic and may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts. are described in greater detail below.

Examples, Components, and Alternatives

The following sections describe selected aspects of illustrative suspension systems for one-wheeled vehicles, as well as related systems and/or methods. The examples in these sections are intended for illustration and should not be interpreted as limiting the entire scope of the present disclosure. Each section may include one or more distinct inventions, and/or contextual or related information, function, and/or structure.

A. One-Wheeled Vehicle Having a First Illustrative Suspension System

With reference to FIGS. 1-7, this section describes a one-wheeled vehicle 100 having a suspension system 150, which is an example of the suspension system described above.

Vehicle 100 is a one-wheeled, self-stabilizing skateboard including a board 102 (AKA a tiltable portion of the vehicle, a platform, a foot deck) having a frame 104 supporting a first deck portion 106 and a second deck portion 108 defining an opening 120 therebetween. Board 102 may generally define a plane. Each deck portion 106, 108 (e.g., including a foot pad) is configured to receive and support a left or right foot of a rider oriented generally perpendicular to a direction of travel of the board.

Vehicle 100 also includes a wheel assembly 122. Wheel assembly 122 includes a rotatable ground-contacting element 124 (e.g., a tire, wheel, or continuous track) disposed between and extending above first and second deck portions 106, 108, and a motor assembly 126 configured to rotate ground-contacting element 124 to propel the vehicle. As shown in FIG. 1 and elsewhere, vehicle 100 may include exactly one ground-contacting element, disposed between the first and second deck portions. In some examples, vehicle 100 may include a plurality of (e.g., coaxial) ground-contacting elements.

Wheel assembly 122 is disposed between first and second deck portions 106, 108. Ground-contacting element 124 is coupled to motor assembly 126. An axle 128 (AKA a shaft) of motor assembly 126 is coupled to board 102 via suspension system 150. Motor assembly 126 is configured to rotate ground-contacting element 124 around (or about) axle 128 to propel vehicle 100. For example, motor assembly 126 may include an electric motor, such as a hub motor, configured to rotate ground-contacting element 124 about axle 128 to propel vehicle 100 along the ground. For convenience, ground-contacting element 124 is hereinafter referred to as a tire or wheel, although other suitable embodiments may be provided.

First and second deck portions 106, 108 are located on opposite sides of wheel assembly 122, with board 102 being dimensioned to approximate a skateboard. In other embodiments, the board may approximate a longboard skateboard, snowboard, surfboard, or may be otherwise desirably dimensioned. In some examples, deck portions 106, 108 of board 102 are at least partially covered with a non-slip material (e.g., grip tape or other textured material) to aid in rider control.

Frame 104 may include any suitable structure configured to rigidly support the deck portions and to be coupled to the axle of the wheel assembly by way of the suspension system, such that the weight of a rider is supportable on tiltable board 102. Frame 104 generally has a fulcrum at the wheel assembly axle. Frame 104 includes one or more frame members 130, on which deck portions 106 and 108 are mounted, and which may further support additional elements and features of the vehicle, such as a charging port 132 and a power switch 134. Additionally, end bumpers, lighting assemblies, and other physical or electrical systems may be supported by frame member(s) 130.

Vehicle 100 includes an electrical control system 136. Electrical control system 136 is an example of electrical control system 300 described below with respect to FIG. 14. Aspects of electrical control system 136 may be incorporated into first and/or second deck portions 106, 108. The electrical control system is described further below in Section C.

Wheel 124 is configured to be wide enough in a heel-toe direction that the rider can balance in the heel-toe direction manually, i.e., by shifting his or her own weight, without automated assistance from the vehicle. Ground contacting member 124 may be tubeless, or may be used with an inner tube. In some examples, ground contacting member 124 is a non-pneumatic tire. For example, ground contacting member 124 may be "airless", solid, and/or may comprise a foam. Ground contacting member 124 may have a profile such that the rider can lean vehicle 100 over an edge of the ground contacting member through heel and/or toe pressure to facilitate cornering of vehicle 100.

Motor assembly 126 may include any suitable driver of ground contacting member 124, such as a hub motor mounted within ground contacting portion 124. The hub motor may be internally geared or may be direct-drive. The use of a hub motor facilitates the elimination of chains and belts, and enables a form factor that considerably improves maneuverability, weight distribution, and aesthetics. Mounting ground contacting portion 124 onto motor assembly 126 may be accomplished by a split-rim design (e.g., using hub adapters) which may be bolted on to motor assembly 126, by casting or otherwise providing a housing of the hub motor such that it provides mounting flanges for a tire bead directly on the housing of the hub motor, or any other suitable method.

Figure 2:
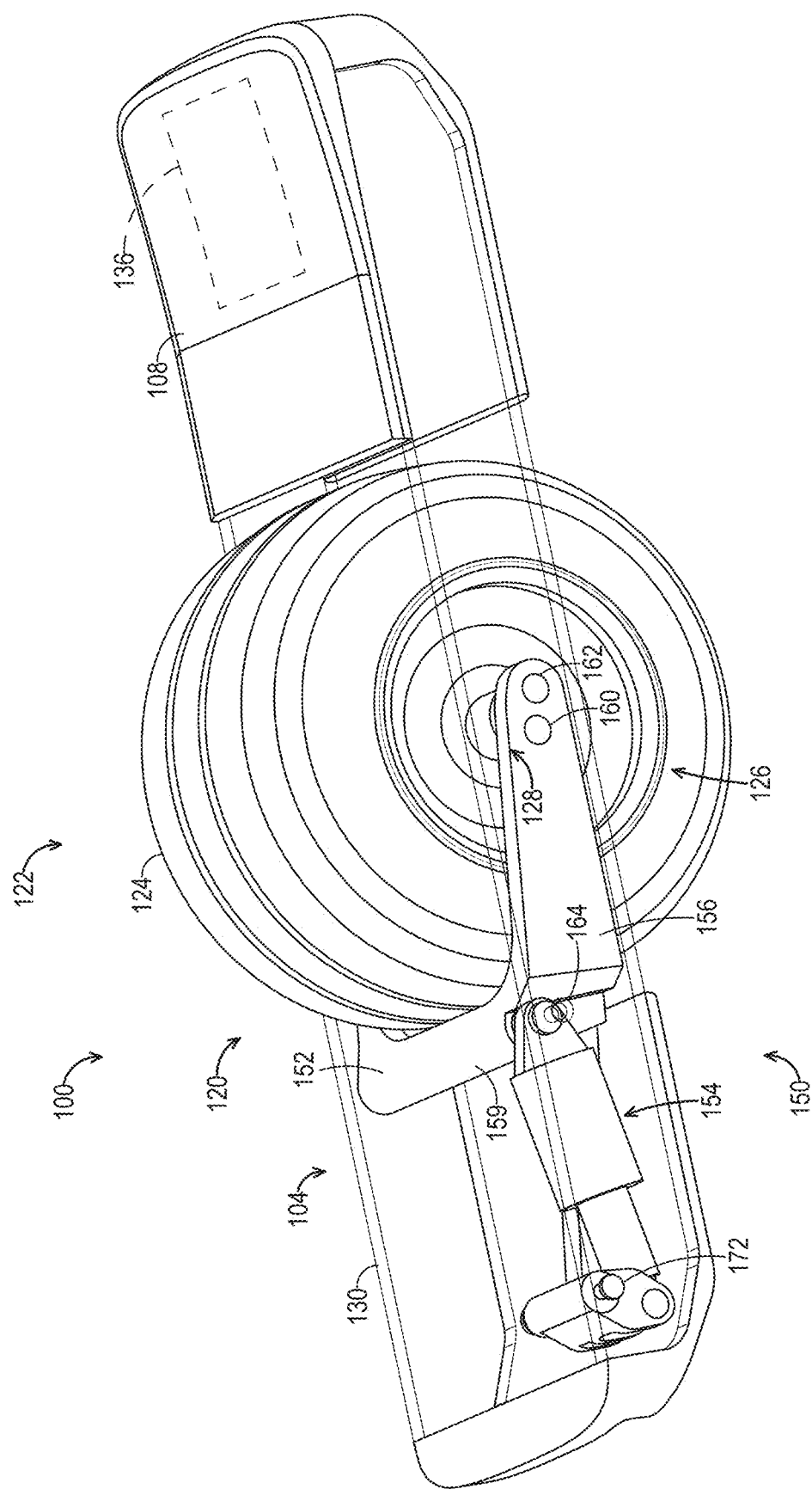
FIG. 2 is an isometric view of the one-wheeled vehicle of FIG. 1 having a first illustrative suspension system.
Figure 3:
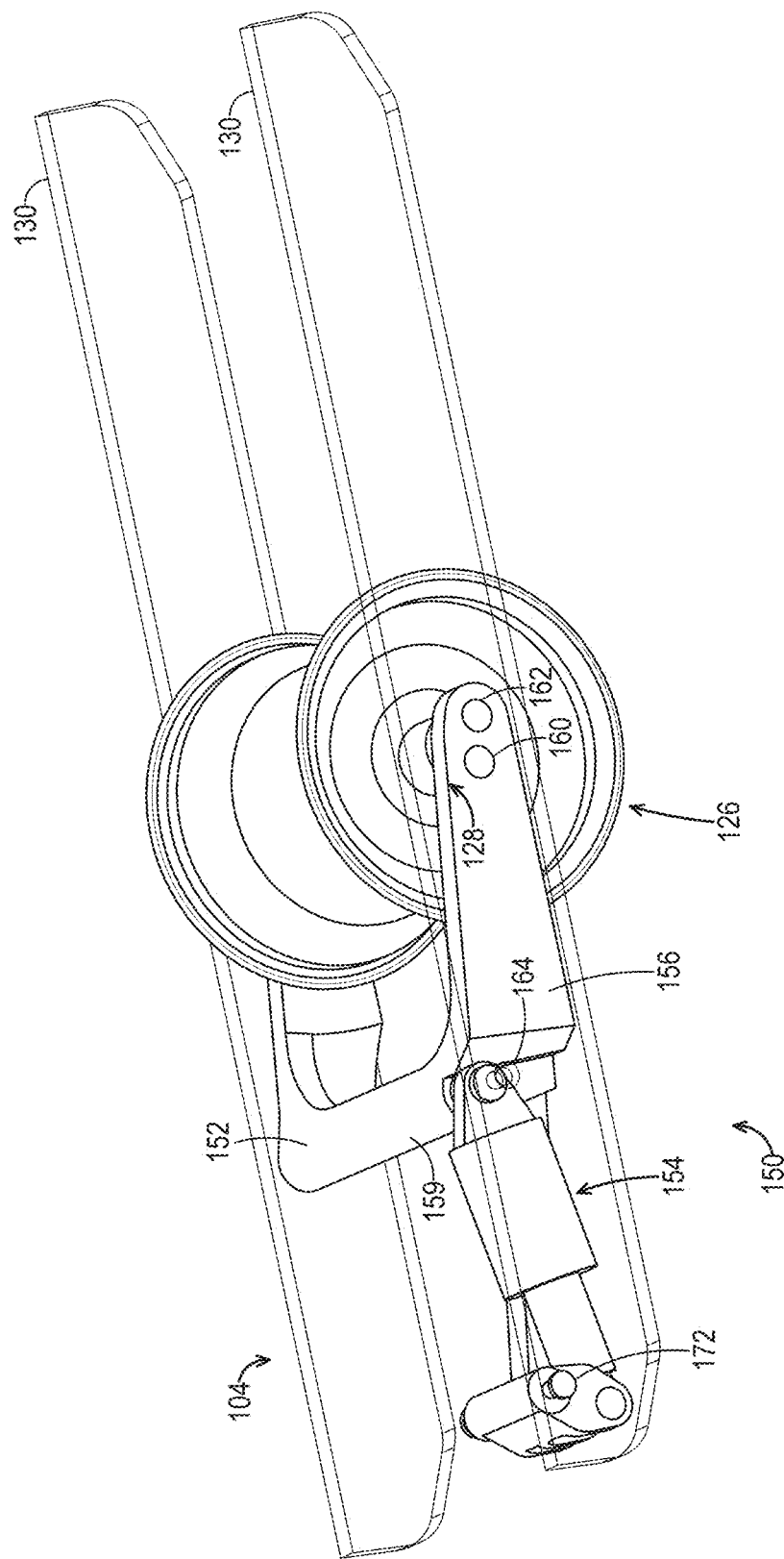
FIG. 3 is an isometric view of the suspension system of FIG. 2.
Figure 4:
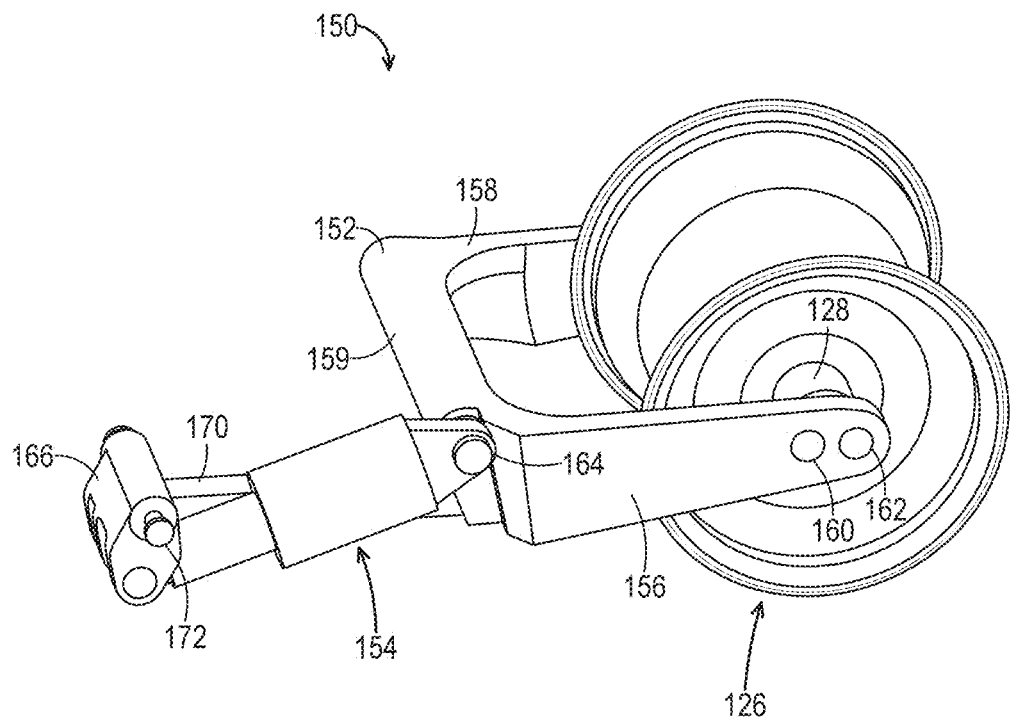
FIG. 4 is another isometric view of the suspension system of FIG. 2.
Figure 5:
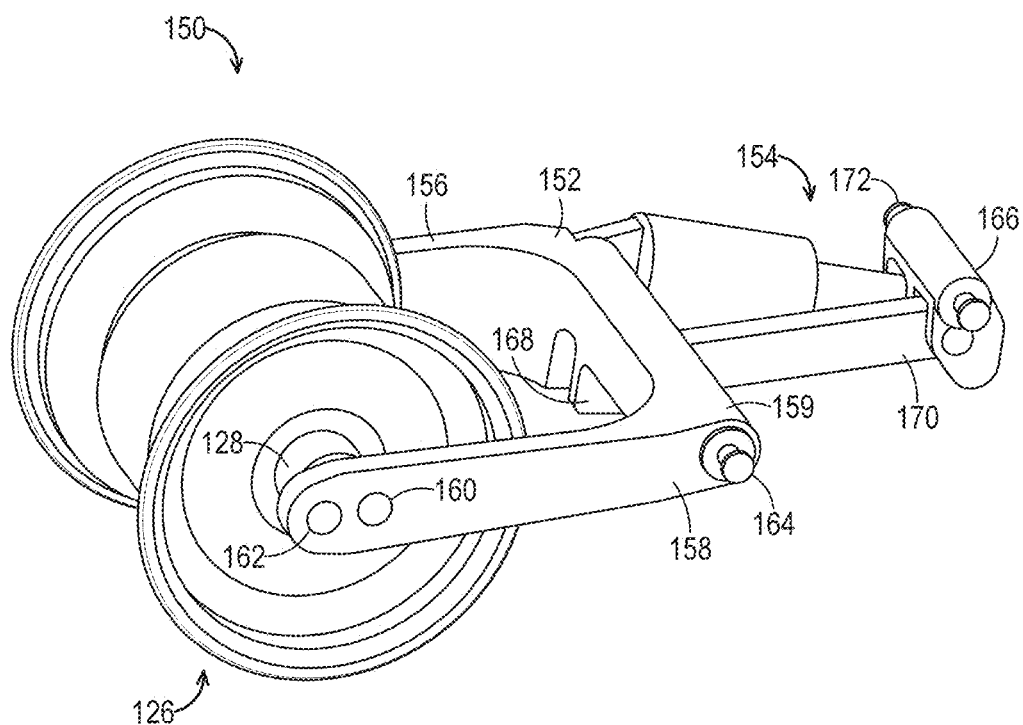
FIG. 5 is another isometric view of the suspension system of FIG. 2.

As shown in FIGS. 2 and 3, motor assembly 126, and therefore ground contacting member 124, are coupled to frame 104 by suspension system 150.

Suspension system 150 includes a swingarm 152 and a shock absorber 154, as mentioned above. Swingarm 152 is an inflexible, substantially U-shaped structure having a pair of rigid, spaced-apart arms 156, 158. Arms 156 and 158 extend longitudinally (with respect to the board) from a transverse, pivoting cross member 159 (also referred to as a connecting member) to straddle motor assembly 126 and ground contacting member 124.

More specifically, the respective distal ends of arms 156 and 158 are coupled to opposing ends of axle 128. Arms 156 and 158 are fixed to axle 128, such that the swing arm and the axle rotate together (i.e., the swing arm does not rotate with respect to the axle). As shown in FIG. 2 and elsewhere, end portions of arms 156, 158 are each attached to a respective end of axle 128 using a pair of spaced apart axle mounting members 160, 162. In the example shown in FIG. 2, axle mounting members 160, 162 are removable fasteners. The use of two mounting members on each end of the axle enables the board to be tilted/rotated, e.g., while riding, without risking the unthreading or otherwise loosening of the mounting members from the axle. Additionally, the two mounting members rigidly connect the swingarm to the axle such that the swingarm cannot pivot or otherwise rotate with respect to the axle.

At the proximal end of arms 156, 158, swingarm 152 is pivotably attached at cross member 159 to vehicle 100 by support members 164. Support members 164 are affixed (e.g., bolted) to frame member 130 of board 102, and are configured to pivotably retain an end portion of cross member 159. In some examples, the support members are unitary with frame member 130 (e.g., the frame member and the support members are formed as a single piece).

Accordingly, swingarm 152 is pivotable about support members 164 with respect to board 102 and frame 104. This pivotable arrangement facilitates a swinging, generally vertical movement of motor assembly 126 (and therefore wheel assembly 122) with respect to the board. In other words, the wheel can move up and down with respect to the board, through an arc corresponding to a radius defined by extension arms 156 and 158 (i.e., arcuate motion, also referred to as arcuately vertical). The arcuate motion is shown in a dotted curve 167 in FIG. 6.

However, this motion of the wheel is generally only desirable in response to a need, such as when riding the vehicle over a bump in the road or on uneven terrain. Furthermore, the motion should be controlled or damped to allow for rider control and comfort. Accordingly, suspension system 150 includes shock absorber 154 (e.g., a gas spring), configured to bias the swing arm and board toward a desired riding configuration (e.g., board height and orientation with respect to the axle), including when the rider is aboard. Shock absorber 154 is pivotably coupled at a first end 163 to swingarm 152 and pivotably coupled at a second end 165 to a rocker 166. Shock absorber 154 may include any suitable damping device. In this example, shock absorber 154 includes an air shock absorber. Damping characteristics of the shock may be adjustable or selectable. In some examples, the shock may include a lockout feature.

Figure 6:
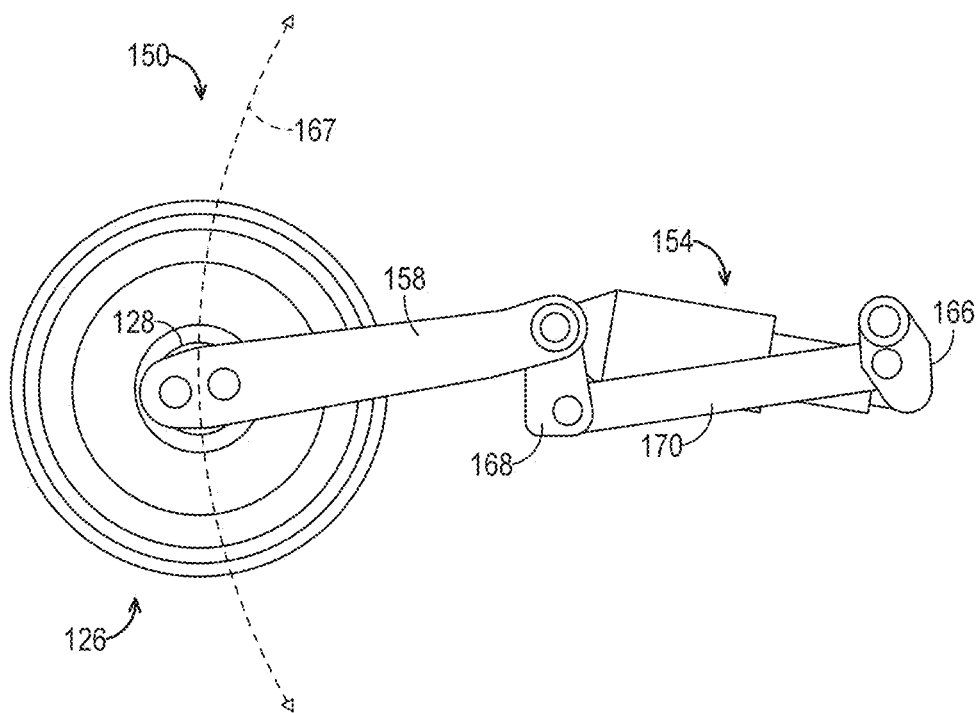
FIG. 6 is a side elevation view of the suspension system of FIG. 2.
Figure 7:
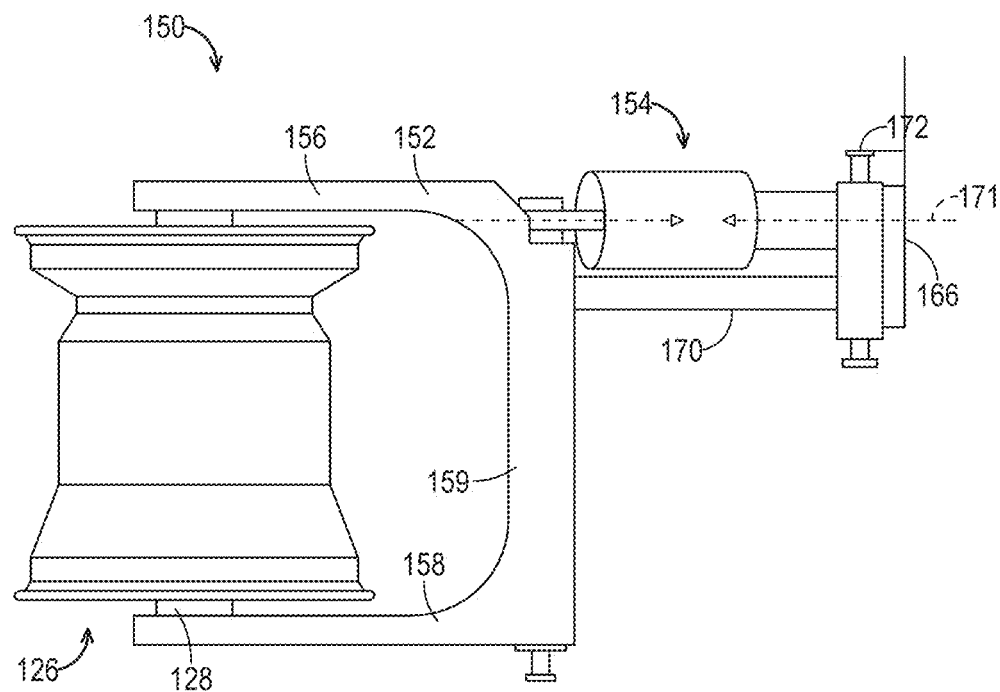
FIG. 7 is a plan view of the suspension system of FIG. 2.

As shown in FIGS. 6 and 7, the pivotal connection of shock absorber 154 at first end 163 and the pivotal connection of swingarm 152 at support members 164 share a common rotational axis through cross member 159.

Swingarm 152 includes a vertical extension 168 (see FIGS. 5 and 6) extending generally downward from a proximal end of extension arm 156 below cross member 159. A pushrod 170 is pivotably attached at a first end to vertical extension 168 of swingarm 152 and pivotably attached at a second end to rocker 166. Rocker 166 is pivotably attached to at least frame member 130 at support member 172.

In operation, the upward arcuate motion of wheel assembly 122 about support members 164, as depicted in FIG. 6, thereby causes a corresponding rotation of vertical extension 168. This rotation pulls pushrod 170 generally toward wheel assembly 122, thereby causing a rotation of rocker 166 about support member 172. According, the rotation of rocker 166 causes a compression in shock absorber 154 as shown by dotted lines 171 in FIG. 7.

Returning to FIGS. 1 and 2, the arcuate motion of wheel assembly 126 corresponds to the rotation of arms 156, 158 with respect to frame members 130. Accordingly, bumpers 174, 176 are disposed on an upper lip of frame member 130, each bumper corresponding to one of arms 156, 158. In the case that the rider experiences a large enough bump while riding, wheel assembly 122 will move generally upward with respect to board 102 as described above, thereby causing arms 156, 158 to contact or abut bumpers 174, 176 and be arrested thereby. This configuration prevents arms 156, 158 from directly striking frame members 130. Bumpers 174, 176 may comprise any suitable impact absorbing material, such as a rubber or other elastomer.

B. One-Wheeled Vehicle Having a Second Illustrative Suspension System

With reference to FIGS. 8-13, this section describes a one-wheeled vehicle 200 having a suspension system 250, which is an example of the suspension system described above.

Vehicle 200 is a one-wheeled, self-stabilizing skateboard including a board 202 (AKA a tiltable portion of the vehicle, a platform, a foot deck) having a frame 204 supporting a first deck portion 206 and a second deck portion 208 defining an opening 220 (AKA an aperture) therebetween. Board 202 may generally define a plane. Each deck portion 206, 208 (e.g., including a foot pad) is configured to receive and support a left or right foot of a rider oriented generally perpendicular to a direction of travel of the board.

Figure 8:
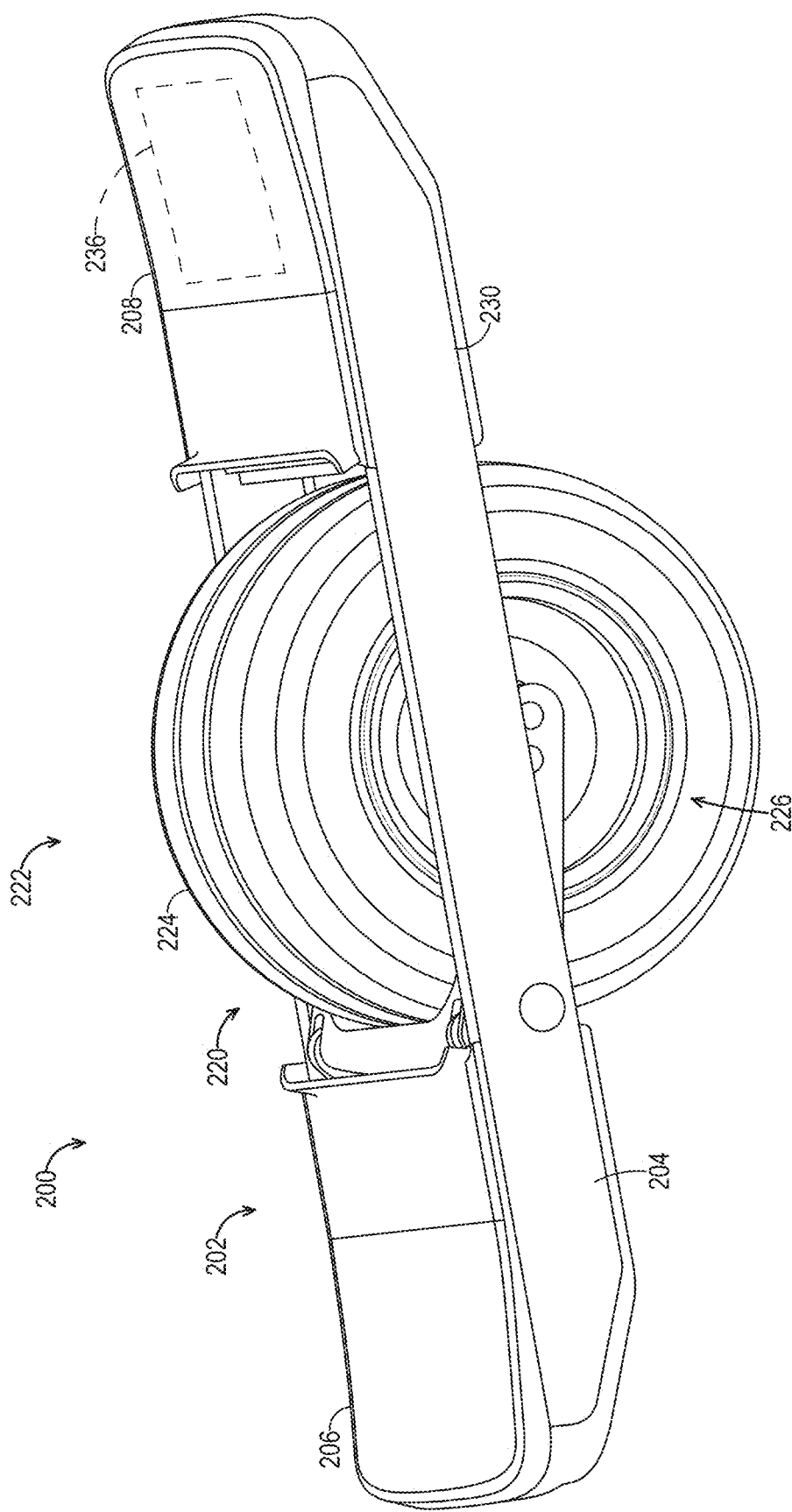
FIG. 8 is an isometric view of a one-wheeled vehicle in accordance with aspects of the present disclosure.

Vehicle 200 also includes a wheel assembly 222. Wheel assembly 222 includes a rotatable ground-contacting element 224 (e.g., a tire, wheel, or continuous track) disposed between and extending above first and second deck portions 206, 208, and a motor assembly 226 configured to rotate ground-contacting element 224 to propel the vehicle. As shown in FIG. 8 and elsewhere, vehicle 200 may include exactly one ground-contacting element, disposed between the first and second deck portions. In some examples, vehicle 200 may include a plurality of (e.g., coaxial) ground-contacting elements.

Wheel assembly 222 is disposed between first and second deck portions 206, 208. Ground-contacting element 224 is coupled to motor assembly 226. An axle 228 (AKA a shaft) of motor assembly 226 is coupled to board 202 via suspension system 250. Motor assembly 226 is configured to rotate ground-contacting element 224 around (or about) axle 228 to propel vehicle 200. For example, motor assembly 226 may include an electric motor, such as a hub motor, configured to rotate ground-contacting element 224 about axle 228 to propel vehicle 200 along the ground. For convenience, ground-contacting element 224 is hereinafter referred to as a tire or wheel, although other suitable embodiments may be provided.

First and second deck portions 206, 208 are located on opposite sides of wheel assembly 222 with board 202 being dimensioned to approximate a skateboard. In other embodiments, the board may approximate a longboard skateboard, snowboard, surfboard, or may be otherwise desirably dimensioned. In some examples, deck portions 206, 208 of board 202 are at least partially covered with a non-slip material (e.g., grip tape or other textured material) to aid in rider control.

Frame 204 may include any suitable structure configured to rigidly support the deck portions and to be coupled to the axle of the wheel assembly by way of the suspension system, such that the weight of a rider is supportable on tiltable board 202. Frame 104 generally has a fulcrum at the wheel assembly axle. Frame 204 includes one or more frame members 230, on which deck portions 206 and 208 are mounted, and which may further support additional elements and features of the vehicle, such as a charging port 232 and a power switch 234. Additionally, end bumpers, lighting assemblies, and other physical or electrical systems may be supported by frame member(s) 230.

Vehicle 200 includes an electrical control system 236. Electrical control system 236 is an example of electrical control system 300 described below with respect to FIG. 14. Aspects of electrical control system 236 may be incorporated into first and/or second deck portions 206, 208. The electrical control system is described further below in Section C.

Ground contacting member 224 is configured to be wide enough in a heel-toe direction that the rider can balance in the heel-toe direction manually, i.e., by shifting his or her own weight, without automated assistance from the vehicle. Ground contacting member 224 may be tubeless, or may be used with an inner tube. In some examples, ground contacting member 224 is a non-pneumatic tire. For example, ground contacting member 224 may be "airless", solid, and/or may comprise a foam. Ground contacting member 224 may have a profile such that the rider can lean vehicle 200 over an edge of the ground contacting member through heel and/or toe pressure to facilitate cornering of vehicle 200.

Motor assembly 226 may include any suitable driver of ground contacting member 224, such as a hub motor mounted within ground contacting portion 224. The hub motor may be internally geared or may be direct-drive. The use of a hub motor facilitates the elimination of chains and belts, and enables a form factor that considerably improves maneuverability, weight distribution, and aesthetics. Mounting ground contacting portion 224 onto motor assembly 226 may be accomplished by a split-rim design (e.g., using hub adapters) which may be bolted on to motor assembly 226, by casting or otherwise providing a housing of the hub motor such that it provides mounting flanges for a tire bead directly on the housing of the hub motor, or any other suitable method.

Figure 9:
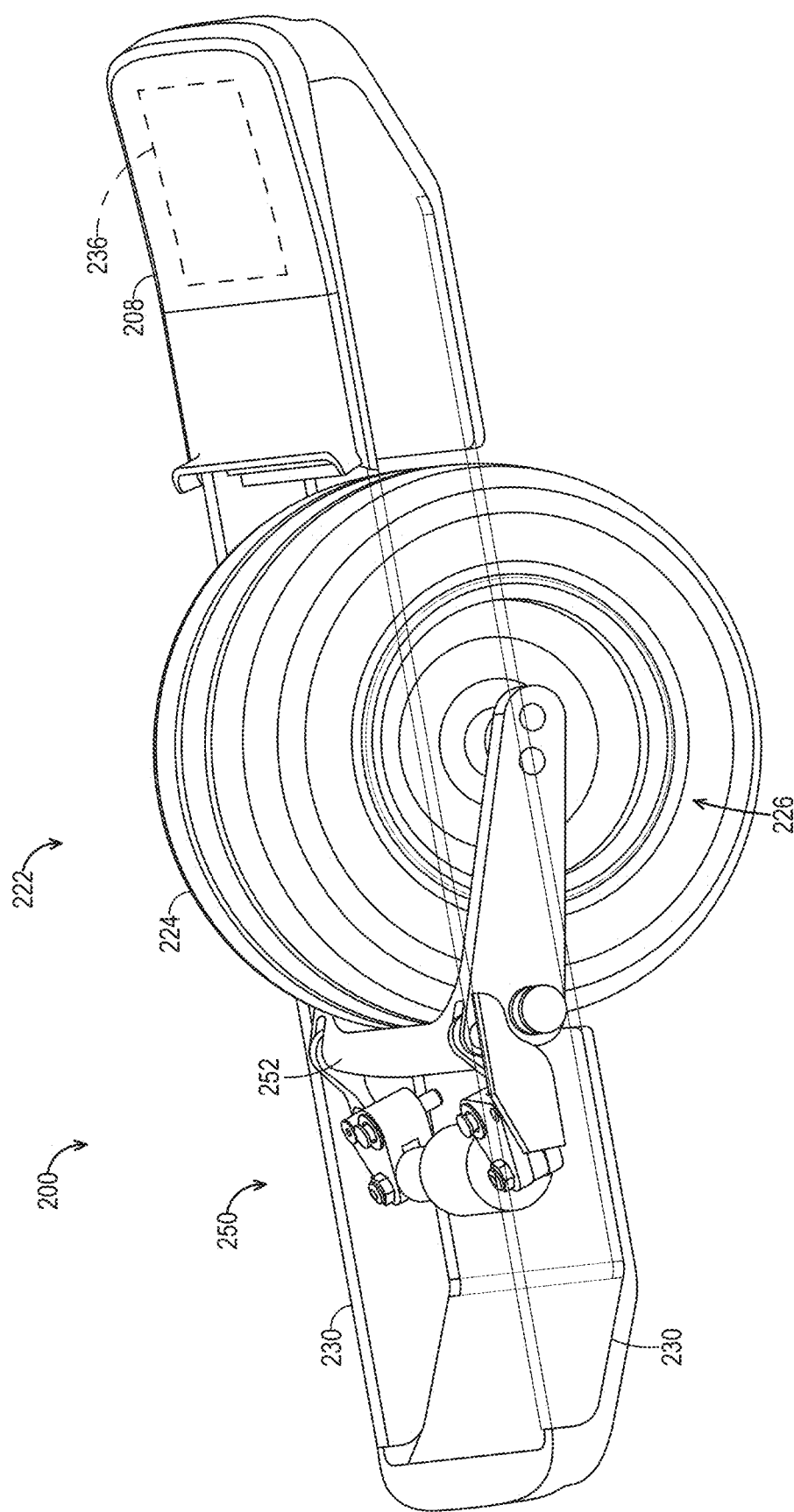
FIG. 9 is an isometric view of the one-wheeled vehicle of FIG. 8 having a second illustrative suspension system.

As shown in FIG. 9, motor assembly 226, and therefore ground contacting member 224, are coupled to frame 204 by suspension system 250. Suspension system 250 includes a swingarm 252 and a transversely mounted shock absorber 254 configured to dampen the motion of the swingarm. Swingarm 252 is a substantially U-shaped structure having a pair of rigid, spaced-apart arms 256, 258. Arms 256 and 258 extend longitudinally (with respect to the board) from a transverse, pivoting cross member 259 (also referred to as a connecting member) to straddle motor assembly 226 and ground contacting member 224.

More specifically, the respective distal ends of arms 256 and 258 are coupled to opposing ends of axle 228. Arms 256 and 258 are fixed to axle 228, such that the swing arm and the axle rotate together (i.e., the swing arm does not rotate with respect to the axle). As shown in FIG. 9, end portions of arms 256, 258 are each attached to a respective end of axle 228 using a pair of axle mounting members 260, 262. In the current example, axle mounting members 260, 262 are removable fasteners. The use of two mounting members enables the board to be tilted/rotated, e.g., while riding, without risking the unthreading or otherwise loosening of the mounting members from the axle. Additionally, the two mounting members rigidly connect the swingarm to the axle such that the swingarm cannot pivot or otherwise rotate with respect to the axle.

Figure 10:
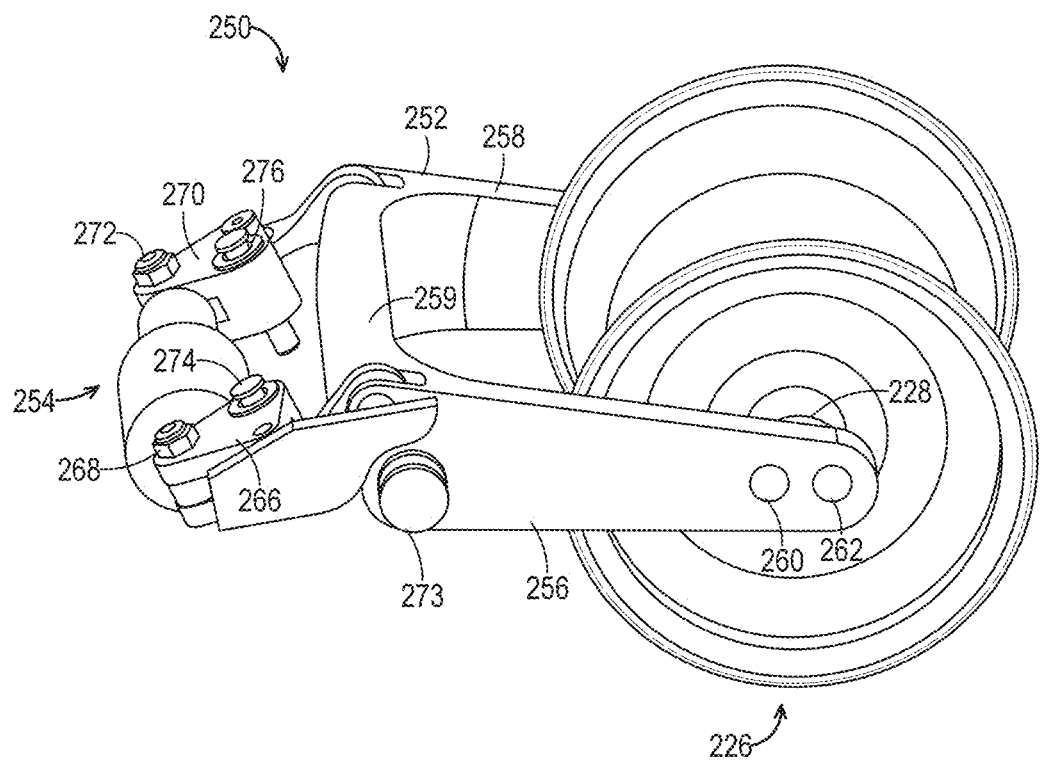
FIG. 10 is an isometric view of the suspension system of FIG. 9.
Figure 11:
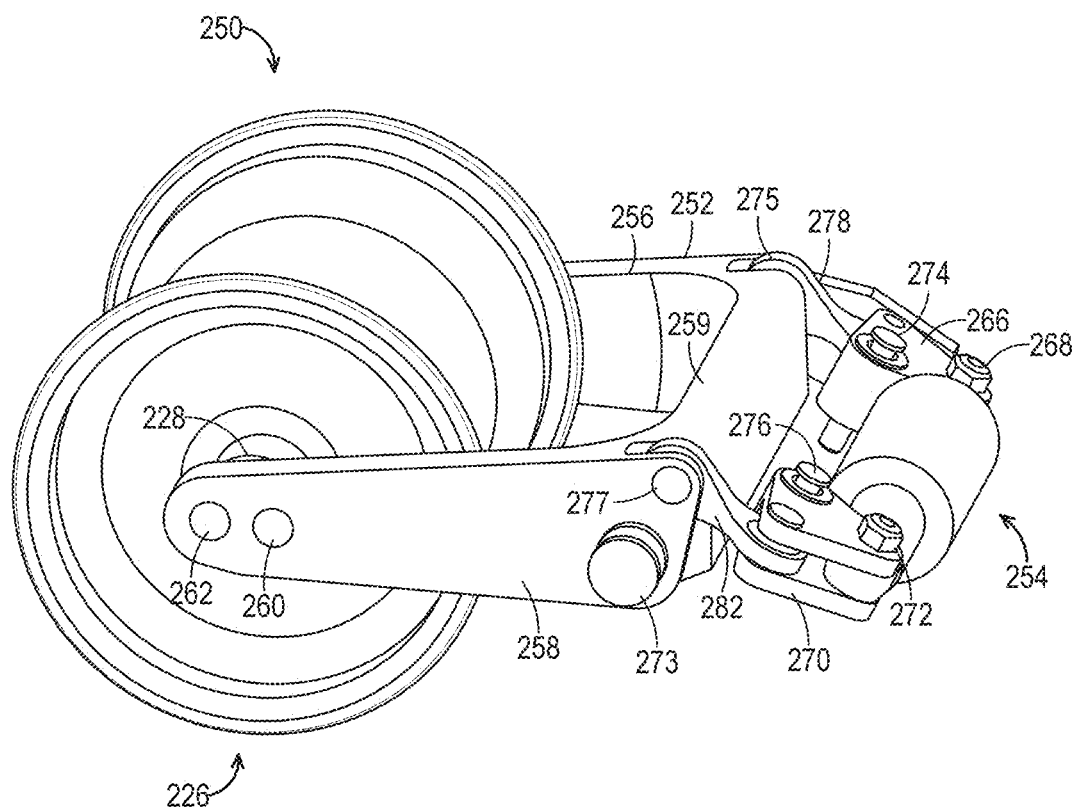
FIG. 11 is another isometric view of the suspension system of FIG. 9.

At the proximal end of arm 258, swingarm 252 is pivotably coupled to vehicle 200 at a fulcrum 273 (see FIGS. 10, 11). Fulcrum 273 is formed by a suitable rotating fastener (e.g., bolts with bearing, etc.) coupled to frame member 230 of board 202, and is configured to pivotably retain swingarm 252.

Accordingly, swingarm 252 is pivotable at one end with respect to board 202 and frame 204 about fulcrum 273. This pivotable arrangement facilitates a swinging, generally vertical movement of motor assembly 226 (and therefore wheel assembly 222) with respect to the board. In other words, the wheel can move up and down with respect to the board, through an arc corresponding to a radius defined by extension arms 256 and 258 (i.e., arcuate motion, also referred to as arcuately vertical). The arcuate motion is shown in a dotted curve 267 in FIG. 12.

However, this motion of the wheel is generally only desirable in response to a need, such as when riding the vehicle over a bump in the road or on uneven terrain. Furthermore, the motion should be controlled or damped to allow for rider control and comfort. Accordingly, suspension system 250 includes shock absorber 254 (e.g., a gas spring), configured to bias the swing arm and board toward a desired riding configuration (e.g., board height and orientation with respect to the axle), including when the rider is aboard. Shock absorber 254 may include any suitable damping device. In this example, shock absorber 254 includes an air shock absorber. Damping characteristics of the shock may be adjustable or selectable. In some examples, the shock may include a lockout feature.

A first end of shock absorber 254 is pivotably attached to a first bell crank 266 at a first pivot joint 268 (AKA a moving pivot joint). Shock absorber 254 is pivotably attached at a second end to a second bell crank 270 at a second pivot joint 272. Bell cranks 266, 270 each include a pivotable support member 274, 276, defining a fixed pivot joint. The support members are configured to be attached to a supporting structure under board 202. Support members 274, 276 pivotally retain the bell cranks at a rotatably fixed location, opposing each other across a width of board 202.

As shown in FIGS. 8 and 9, shock absorber 254 and bell cranks 266, 270 are disposed in a location below the plane of board 202. In other words, the entirety of shock absorber 254 and bell cranks 266, 270 are disposed under deck portion 206, and do not extend above the foot deck.

Figure 13:
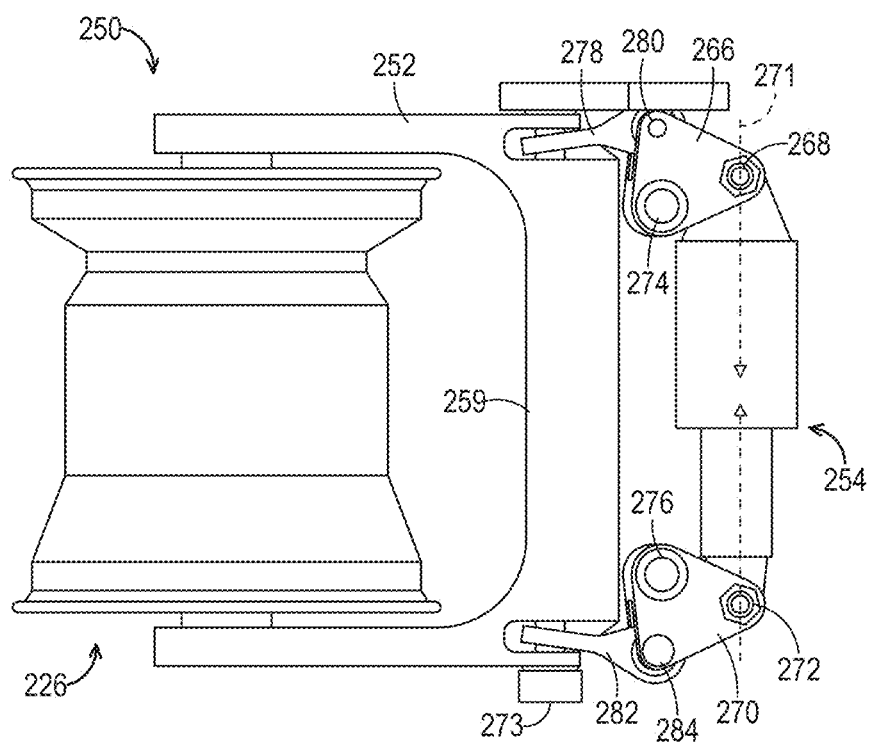
FIG. 13 is a plan view of the suspension system of FIG. 9.

A first pushrod 278 couples a third pivot joint 280 (a moving pivot joint) of first bell crank 266 to cross member 259 at pivoting load member 275. Similarly, a second pushrod 282 couples a fourth pivot joint 284 (a moving pivot joint) of second bell crank 270 to cross member 259 at pivoting load member 277. First and second pushrods 278, 282 are coupled at pivoting load members 275, 277 to cross member 259 in respective slots, as best shown in FIG. 13. In other words, the pushrods are at least partially recessed into cross member 259.

Figure 12:
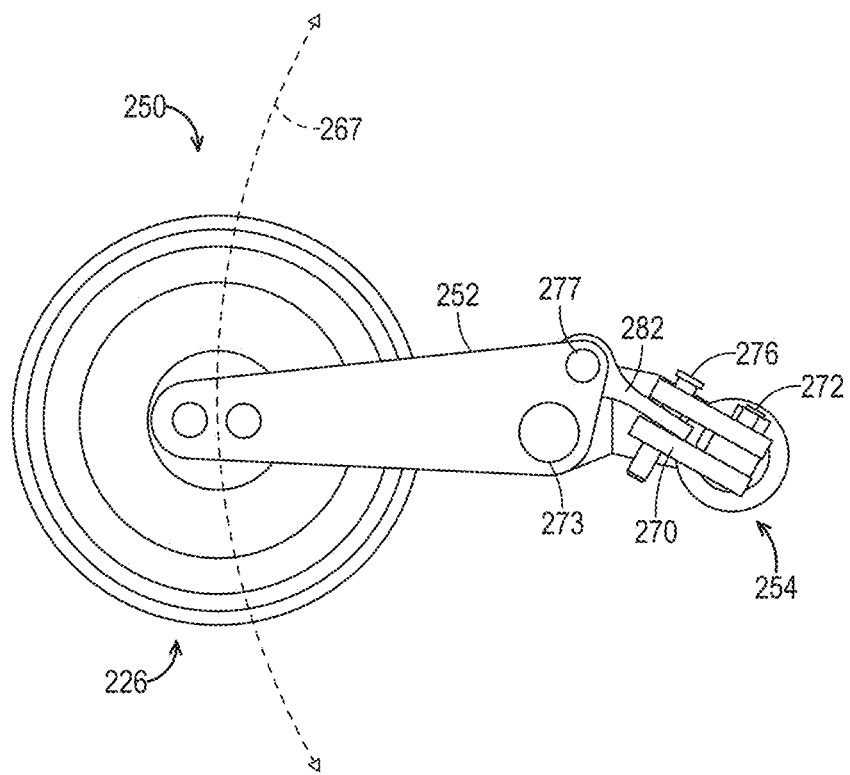
FIG. 12 is a side elevation view of the suspension system of FIG. 9.

As shown in FIGS. 12 and 13, first and second pushrods 278, 282 are pivotable at load members 275, 277 with respect to cross member 259 in a first rotating direction and the pivotable with respective to the bell cranks at pivot joints 280, 284 in an second, orthogonal rotating direction. In other words, pushrods 278, 282 have two degrees of freedom and are configured to transform the generally vertical motion of swingarm 252 to the generally horizontal rotation of bell cranks 266, 270 about support members 274, 276.

As shown in FIGS. 11 and 12, swingarm 252 forms a lever rotating about fulcrum 273 with an applied force at the connection with axle 228 and the load being at load members 275, 277. Because the relative horizontal location of the fulcrum is generally between the applied force and the load, swingarm 252 forms a first-class lever. This configuration provides an advantageously positive mechanical advantage. Additionally, this configuration enables more control of the shock absorbing properties of the suspension system since the load (i.e., load members 275, 277) has a larger travel distance in a first-class lever configuration (as opposed to a second-class lever configuration). In other words, the first-class lever configuration enables the suspension system to have a larger compressible distance than other configurations.

In operation, an upward motion of motor assembly 226 (and therefore wheel assembly 222) applies a force to the distal ends of swingarm 252, causing rotation about fulcrum 273. This rotation transfers energy to load members 275, 277 causing pushrods 278, 282 to be pushed lengthwise in a direction generally away from motor assembly 226. As a result, the pushrods cause bell cranks 266, 270 to rotate generally inward about support members 274, 276, compressing shock absorber 254, as shown by dotted lines 271 in FIG. 13.

C. Electrical Control System

Figure 14:
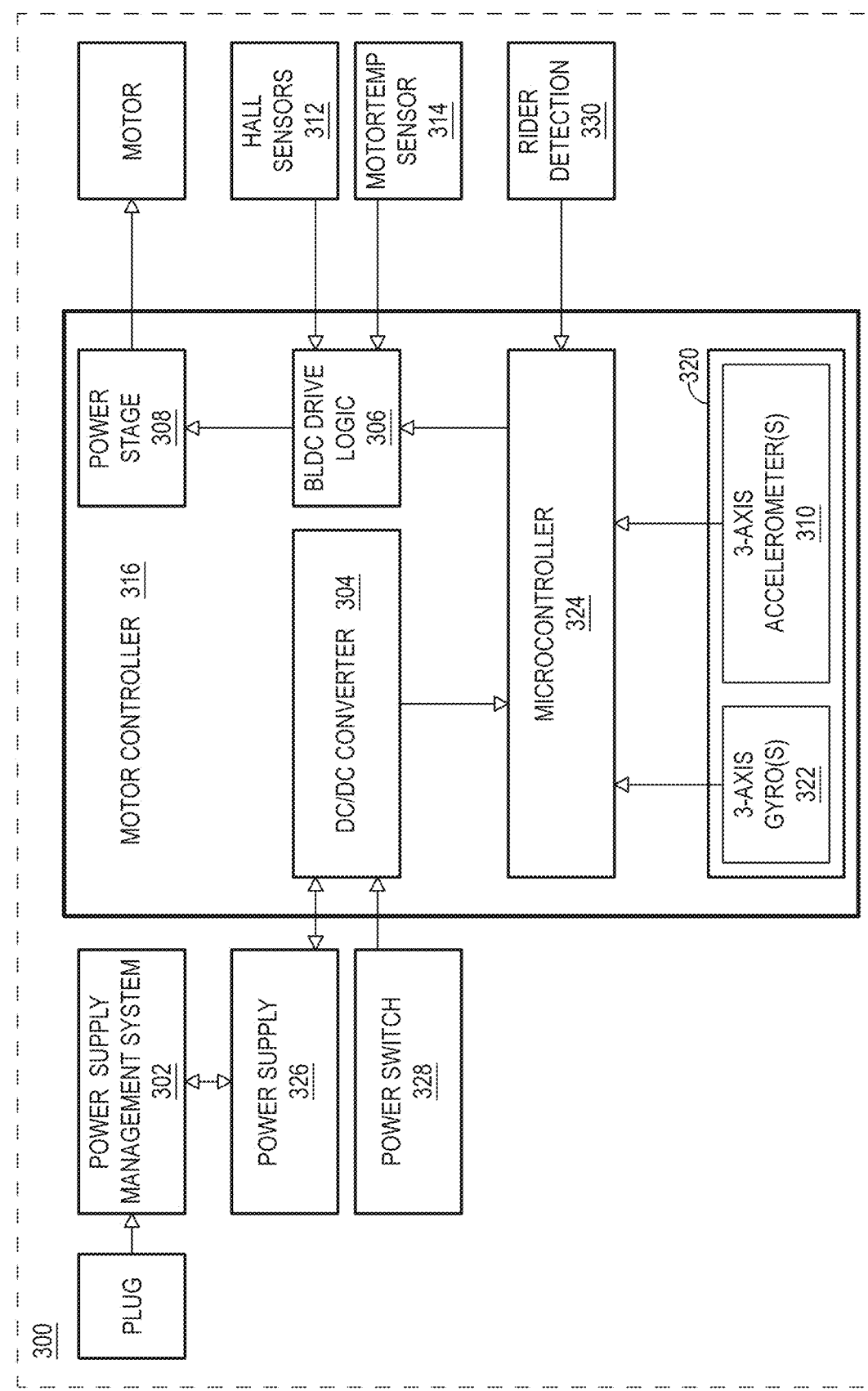
FIG. 14 is a schematic diagram depicting an illustrative electrical control system suitable for use with vehicles in accordance with aspects of the present disclosure.

FIG. 14 shows a block diagram of an electrical control system 300, an example of electrical control systems 136 and 236 described briefly above, comprising various illustrative electrical components of vehicles 100, 200. The electrical components may include a power supply management system 302, a direct current to direct current (DC/DC) converter 304, a brushless direct current (BLDC) drive logic 306, a power stage 308, one or more 2-axis accelerometers 310, one or more hall sensors 312, and/or a motor temperature sensor 314. DC/DC converter 304, BLDC drive logic 306, and power stage 308 may be included in and/or connected to a motor controller 316. Accelerometer(s) 310 may be included in the one or more orientation or tilt sensors 318 mentioned above.

Active balancing (or self-stabilization) of the electric vehicle may be achieved through the use of a feedback control loop or mechanism. The feedback control mechanism may include sensors 320, which may be electrically coupled to and/or included in motor controller 316. Preferably, the feedback control mechanism includes a Proportional-Integral-Derivative (PID) control scheme using one or more gyros 322 and one or more accelerometers (e.g., accelerometer(s) 310). Gyro 322 may be configured to measure a pivoting of the board about its pitch axis (also referred to as the fulcral axis). Gyro 322 and accelerometer 310 may be collectively configured to estimate (or measure, or sense) a lean angle of the board, such as an orientation of the foot deck about the pitch, roll and/or yaw axes. In some embodiments, gyro 322 and accelerometer 310 may be collectively configured to sense orientation information sufficient to estimate the lean angle of the frame, including pivotation about the pitch, roll and/or yaw axes.

As mentioned above, orientation information of the board may be measured (or sensed) by gyro 322 and accelerometer 310. The respective measurements (or sense signals) from gyro 322 and accelerometer 310 may be combined using a complementary or Kalman filter to estimate a lean angle of the board (e.g., pivoting of the board about the pitch, roll, and/or yaw axes, with pivoting about the pitch axis corresponding to a pitch angle, pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 322 and accelerometer 310 may be connected to a microcontroller 324, which may be configured to correspondingly measure movement of the board about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive the motor to reduce an angle of the board with respect to the ground. For example, if a rider were to angle the board downward, so that the first deck portion was 'lower' than the second deck portion (e.g., if the rider pivoted the board in a first rotational direction), then the feedback loop may drive the motor to cause rotation of tire about the pitch axis in the first rotational direction, thereby causing a force on the board in the second, opposing rotational direction.

Thus, motion of the electric vehicle may be achieved by the rider leaning his or her weight toward a selected (e.g., "front") foot. Similarly, deceleration may be achieved by the rider leaning toward the other (e.g., "back" foot). Regenerative braking can be used to slow the vehicle. Sustained operation may be achieved in either direction by the rider maintaining their lean toward either selected foot.

As indicated in FIG. 15, microcontroller 324 may be configured to send a signal to brushless DC (BLDC) drive logic 306, which may communicate information relating to the orientation and motion of the board. BLDC drive logic 306 may then interpret the signal and communicate with power stage 308 to drive the motor accordingly. Hall sensors 312 may send a signal to the BLDC drive logic to provide feedback regarding a substantially instantaneous rotational rate of the rotor of the motor. Motor temperature sensor 314 may be configured to measure a temperature of the motor and send this measured temperature to logic 306. Logic 306 may limit an amount of power supplied to the motor based on the measured temperature of the motor to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of the board).

Alternatively or additionally, some embodiments may include neural network control, fuzzy control, genetic algorithm control, linear quadratic regulator control, state-dependent Riccati equation control, and/or other control algorithms. In some embodiments, absolute or relative encoders may be incorporated to provide feedback on motor position.

During turning, the pitch angle can be modulated by the heel-toe angle (e.g., pivoting of the board about the roll axis), which may improve performance and prevent a front inside edge of the board from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 14, the various electrical components may be configured to manage a power supply 326. For example, power supply management system 302 may be a battery management system configured to protect batteries of power supply 326 from being overcharged, over-discharged, and/or short-circuited. System 302 may monitor battery health, may monitor a state of charge in power supply 326, and/or may increase the safety of the vehicle. Power supply management system 302 may be connected between a charge plug of the vehicle and power supply 326. The rider (or other user) may couple a charger to the plug and re-charge power supply 326 via system 302.

In operation, power switch 328 may be activated (e.g., by the rider). Activation of switch 328 may send a power-on signal to converter 304. In response to the power-on signal, converter 304 may convert direct current from a first voltage level provided by power supply 326 to one or more other voltage levels. The other voltage levels may be different than the first voltage level. Converter 304 may be connected to the other electrical components via one or more electrical connections to provide these electrical components with suitable voltages.

Converter 304 (or other suitable circuitry) may transmit the power-on signal to microcontroller 324. In response to the power-on signal, microcontroller may initialize sensors 320, and a rider detection device 330.

The electric vehicle may include one or more safety mechanisms, such as power switch 328 and/or rider detection device 330 to ensure that the rider is on the board before engaging the feedback control loop. In some embodiments, rider detection device 330 may be configured to determine if the rider's feet are disposed on the foot deck, and to send a signal causing the motor to enter an active state when the rider's feet are determined to be disposed on the foot deck.

Rider detection device 330 may include any suitable mechanism, structure, or apparatus for determining whether the rider is on the electric vehicle. For example, device 330 may include one or more mechanical buttons, one or more capacitive sensors, one or more inductive sensors, one or more optical switches, one or more force resistive sensors, and/or one or more strain gauges. Rider detection device 330 may be located on or under either or both of the first and second deck portions. In some examples, the one or more mechanical buttons or other devices may be pressed directly (e.g., if on the deck portions), or indirectly (e.g., if under the deck portions), to sense whether the rider is on the board.

In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, rider detection device 330 may include a hand-held "dead-man" switch.

If device 330 detects that the rider is suitably positioned on the electric vehicle, then device 330 may send a rider-present signal to microcontroller 324. The rider-present signal may be the signal causing the motor to enter the active state. In response to the rider-present signal (and/or, for example, the board being moved to the level orientation), microcontroller 324 may activate the feedback control loop for driving the motor. For example, in response to the rider-present signal, microcontroller 324 may send board orientation information (or measurement data) from sensors 320 to logic 306 for powering the motor via power stage 308.

In some embodiments, if device 338 detects that the rider is no longer suitably positioned or present on the electric vehicle, device 338 may send a rider-not-present signal to microcontroller 324. In response to the rider-not-present signal, circuitry of the vehicle (e.g., microcontroller 324, logic 306, and/or power stage 308) may be configured to reduce a rotational rate of the rotor relative to the stator to bring the vehicle to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive the motor even though the rider may not be present on the vehicle (e.g., temporarily), which may allow the rider to perform various tricks. For example, rider detection device 330 may be configured to delay sending the rider-not-present signal to the microcontroller for a predetermined duration of time, and/or the microcontroller may be configured to delay sending the signal to logic 306 to cut power to the motor for a predetermined duration of time.

D. Illustrative Combinations and Additional Examples

This section describes additional aspects and features of the suspension systems described herein, presented without limitation as a series of paragraphs, some or all of which may be alphanumerically designated for clarity and efficiency. Each of these paragraphs can be combined with one or more other paragraphs, and/or with disclosure from elsewhere in this application, including any materials listed in the Cross-References, in any suitable manner. Some of the paragraphs below may expressly refer to and further limit other paragraphs, providing without limitation examples of some of the suitable combinations.

A0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel rotatable about an axle, wherein the wheel is disposed between and extends above and below the first and second deck portions;
a motor assembly configured to rotate the wheel about the axle to propel the vehicle;
at least one sensor configured to measure orientation information of the board;
a motor controller configured to receive orientation information measured by the at least one sensor and to cause the motor assembly to propel the vehicle based on the orientation information; and
a suspension system coupling the axle of the wheel to the board, such that the board is movable up and down relative to the axle, the suspension system including:
a swingarm having a first end pivotably coupled to the frame at a fulcrum and a second end fixed to the axle, wherein the swingarm includes a first moving pivot joint spaced from the fulcrum;
a rocker coupled to the board at a fixed pivot joint and including a second moving pivot joint spaced apart from a third moving pivot joint;
a push rod connecting the second moving pivot joint of the rocker to the first moving pivot joint of the swingarm; and
a shock absorber connected between the fulcrum and the second moving pivot joint of the rocker,
wherein the shock absorber is disposed below the first deck portion and is configured to dampen movement of the board relative to the axle.

A1. The vehicle of paragraph A0, wherein the frame is coupled to the wheel assembly by only the suspension system.

A2. The vehicle of paragraph A0, wherein the swingarm comprises a cross member and at least one leg extending from the cross member.

A3. The vehicle of paragraph A2, wherein the swingarm is U-shaped.

A4. The vehicle of paragraph A0, wherein the second moving pivot joint of the rocker is disposed between the third moving pivot joint and the fixed pivot joint.

A5. The vehicle of paragraph A4, wherein the first moving pivot joint of the swingarm is disposed at a height lower than the fulcrum.

A6. The vehicle of paragraph A0, wherein the shock absorber is a gas shock absorber.

B0. A self-balancing electric vehicle comprising:
- a wheel having an axis of rotation;
- a board including a frame having an aperture to accommodate the wheel, such that the board is tiltable about the wheel, first and second deck portions of the board each configured to receive a left or right foot of a rider oriented generally perpendicular to a direction of travel of the board;
- an electric hub motor configured to drive the wheel;
- a motor controller configured to receive orientation information indicating an orientation of the board and to cause the hub motor to propel the board based on the orientation information; and
- a suspension system including:
  - a swingarm coupling an axle of the wheel to the frame of the board, such that the board is configured to be movable up and down relative to the axle; and
  - a shock absorber oriented transverse to the direction of travel of the board and coupled at each end to the swingarm by a respective bell crank, such that the shock absorber is configured to dampen up and down movement of the board relative to the axle;
- wherein an entirety of the shock absorber is disposed below the first deck portion.

B1. The vehicle of B0, wherein the bell cranks are each coupled to the swingarm by a respective push rod.

B2. The vehicle of B0 or B1, wherein a cross member of the swingarm is pivotably connected to the frame.

B3. The vehicle of any one of paragraphs B0 through B2, wherein legs of the swingarm are fixed at distal ends to respective end portions of the axle.

B4. The vehicle of B3, wherein each leg of the swingarm forms a first class lever with a force applied at the axle and a load disposed at a push rod coupling the swingarm to the shock absorber.

B5. The vehicle of B4, wherein a cross member of the swingarm is pivotably coupled to the frame and forms a fulcrum of the first class lever.

B6. The vehicle of any one of paragraphs B0 through B5, wherein the bell cranks are disposed entirely below the first deck portion.

B7. The vehicle of any one of paragraphs B0 through B6, wherein the frame is coupled to the axle by only the suspension system.

B8. The vehicle of any one of paragraphs B0 through B7, wherein each of the bell cranks is coupled to the board at a respective fixed pivot joint.

B9. The vehicle of B8, wherein each of the bell cranks has a first moving pivot joint rotatably coupled to a respective end of the shock absorber and a second moving pivot joint rotatably couple to a respective pushrod, each pushrod connecting the respective bell crank to the swingarm.

C0. A self-balancing electric vehicle, comprising:
- a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
- a wheel assembly including exactly one wheel rotatable on an axle, wherein the wheel is disposed between and extends above and below the first and second deck portions;
- a motor assembly configured to rotate the wheel about the axle to propel the vehicle;
- a motor controller configured to receive board orientation information measured by at least one sensor and to cause the motor assembly to propel the vehicle based on the board orientation information; and
- a suspension system coupling the wheel assembly to the board, such that the board is configured to be movable up and down relative to the axle, the suspension system including:
  - a swingarm pivotable about a fulcrum coupled to the board, the swingarm including at least one leg coupled to the axle;
  - a first bell crank disposed across a width of the board from a second bell crank, wherein each of the bell cranks is coupled (a) to the board at a respective fixed pivot joint, (b) to a shock absorber at a first moving pivot joint, and (c) to a respective push rod at a second moving pivot joint, such that each of the bell cranks is connected to the swingarm by the respective push rod and the shock absorber is oriented transverse to the direction of travel;
  - wherein the swingarm is coupled to the axle on an opposite side of the fulcrum with respect to the push rods, forming a first class lever.

C1. The vehicle of C0, wherein the shock absorber is disposed entirely below the first deck portion.

C2. The vehicle of C0 or C1, wherein the fulcrum comprises a cross member of the swingarm pivotably connected to the frame.

C3. The vehicle of any one of paragraphs C0 through C2, wherein the at least one leg of the swingarm includes a first leg and a second leg, wherein the first and second legs are fixed at distal ends to respective end portions of the axle.

C4. The vehicle of any one of paragraphs C0 through C3, wherein the bell cranks are disposed entirely below the first deck portion.

C5. The vehicle of claim of any one of paragraphs C0 through C4, wherein the frame is coupled to the axle by only the suspension system.

D0. A self-balancing electric vehicle comprising:
- a wheel driven by a hub motor about an axis of rotation;
- a board including a frame having an aperture to accommodate the wheel, such that the board is tiltable about the wheel, first and second deck portions of the board each configured to receive a left or right foot of a rider oriented generally perpendicular to a direction of travel of the board;
- a motor controller configured to cause the hub motor to propel the board based on board orientation information; and
- a suspension system including:
  - a swingarm coupling an axle of the wheel to the frame of the board, such that the board is movable up and down relative to the axle; and
  - a shock absorber oriented transverse to the direction of travel of the board and coupled at each end to the swingarm by a respective bell crank, such that the shock absorber is configured to dampen up and down movement of the board relative to the axle;

wherein an entirety of the shock absorber is disposed below the first deck portion.

D1. The vehicle of D0, wherein the bell cranks are each coupled to the swingarm by a respective push rod, a cross member of the swingarm is pivotably connected to the frame, and legs of the swingarm are fixed to end portions of the axle.

D2. The vehicle of D1, wherein the swingarm forms a first class lever having a fulcrum at the cross member, and the push rods are disposed on an opposite side of the fulcrum from the axle.

D3. The vehicle of any one of paragraphs D0 through D2, wherein the frame is coupled to the axle by only the suspension system.

E0. A self-balancing electric vehicle, comprising:
a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
a wheel assembly including a wheel rotatable about an axle, wherein the wheel is disposed between and extends above and below the first and second deck portions;
a motor assembly configured to rotate the wheel about the axle to propel the vehicle;
a motor controller configured to receive orientation information of the board measured by at least one sensor and to cause the motor assembly to propel the vehicle based on the orientation information; and
a suspension system coupling the axle of the wheel to the board, such that the board is movable up and down relative to the axle, the suspension system including:
 a swingarm having a first end pivotably coupled to the frame at a fulcrum and a second end fixed to the axle, wherein the swingarm includes a first moving pivot joint spaced from the fulcrum;
 a rocker coupled to the board at a fixed pivot joint and including a second moving pivot joint spaced apart from a third moving pivot joint;
 a push rod connecting the second moving pivot joint of the rocker to the first moving pivot joint of the swingarm; and
 a shock absorber connected between the fulcrum and the third moving pivot joint of the rocker;
wherein the shock absorber is disposed below the first deck portion and is configured to dampen movement of the board relative to the axle.

E1. The vehicle of paragraph E0, wherein the frame is coupled to the wheel assembly by only the suspension system.

E2. The vehicle of E0 or E1, wherein the swingarm comprises a cross member and at least one leg extending from the cross member.

E3. The vehicle of paragraph E2, wherein the swingarm is U-shaped.

E4. The vehicle of any one of paragraphs E0 through E3, wherein the second moving pivot joint of the rocker is disposed between the third moving pivot joint and the fixed pivot joint.

E5. The vehicle of paragraph E4, wherein the first moving pivot joint of the swingarm is disposed at a height lower than the fulcrum.

E6. The vehicle of any one of paragraphs E0 through E5, wherein the shock absorber is a gas shock absorber.

F0. A self-balancing electric vehicle, comprising:
a wheel assembly including a wheel having an axis of rotation;
a board including a frame having an aperture to accommodate the wheel, such that the board is tiltable about the wheel, first and second deck portions of the board each configured to receive a left or right foot of a rider oriented generally parallel to the axis of rotation of the wheel;
an electric hub motor configured to drive the wheel;
a motor controller configured to receive orientation information indicating an orientation of the board and to cause the hub motor to propel the board based on the orientation information; and
a suspension system coupling an axle of the wheel assembly to the board, such that the board is movable up and down relative to the axle, the suspension system including:
 a swingarm forming a first class lever coupled to the frame at a fulcrum;
 a rocker coupled to the board at a fixed pivot joint and including a first moving pivot joint spaced apart from a second moving pivot joint;
 a push rod connecting the first moving pivot joint of the rocker to the swingarm; and
 a shock absorber connected between the fulcrum and the second moving pivot joint of the rocker;
wherein an entirety of the shock absorber is disposed below the first deck portion and is configured to dampen movement of the board relative to the axle.

F1. The vehicle of paragraph F0, wherein the frame is coupled to the wheel assembly by only the suspension system.

F2. The vehicle of paragraph F0 or F1, wherein the swingarm comprises a cross member and at least one leg extending from the cross member.

F3. The vehicle of paragraph F2, wherein the swingarm is U-shaped.

F4. The vehicle of any one of paragraphs F0 through F3, wherein the first moving pivot joint of the rocker is disposed between the second moving pivot joint and the fixed pivot joint.

F5. The vehicle of paragraph F4, wherein the push rod connects to the swingarm at a third moving pivot joint disposed at a height lower than the fulcrum.

F6. The vehicle of any one of paragraphs F0 through F5, wherein the shock absorber is a gas shock absorber.

G0. A self-balancing electric vehicle comprising:
a wheel assembly including a wheel driven by a hub motor about an axle;
a board including a frame having an aperture to accommodate the wheel, such that the board is tiltable about the wheel, first and second deck portions of the board each configured to receive a left or right foot of a rider oriented generally parallel to the axle;
a motor controller configured to cause the hub motor to propel the board based on board orientation information; and
a suspension system including:
 a swingarm having a first end pivotably coupled to the frame at a fulcrum and a second end fixed to the axle, such that the board is movable up and down relative to the axle;
 a rocker coupled to the board at a fixed pivot joint;
 a push rod connecting the rocker to the swingarm; and a shock absorber configured to dampen a motion of the swingarm;
wherein an entirety of the shock absorber is disposed below the first deck portion.

G1. The vehicle of paragraph G0, wherein the frame is coupled to the wheel assembly by only the suspension system.

G2. The vehicle of paragraph G0 or G1, wherein the swingarm comprises a cross member and at least one leg extending from the cross member.

G3. The vehicle of paragraph G2, wherein the swingarm is U-shaped.

G4. The vehicle of any one of paragraphs G0 through G3, wherein the swingarm includes a first moving pivot joint;
the rocker includes a second moving pivot joint spaced apart from a third moving pivot joint such that the second moving pivot joint of the rocker is disposed between the third moving pivot joint and the fixed pivot joint;
wherein the push rod is connected between the second moving pivot joint of the rocker and the first moving pivot joint of the swingarm; and
wherein the shock absorber is connected between the fulcrum and the third moving pivot of the rocker.

G5. The vehicle of paragraph G4, wherein the first moving pivot joint of the swingarm is disposed at a height lower than the fulcrum.

Advantages, Features, and Benefits

The different embodiments and examples of the suspension systems described herein provide several advantages over known solutions for providing suspension for a one-wheeled vehicle. For example, illustrative embodiments and examples described herein allow for a more sensitive adjustment of shock absorbing characteristics.

Additionally, illustrative embodiments and examples described herein allow for a more robust load-bearing connection between the suspension system and the wheel assembly.

Additionally, illustrative embodiments and examples described herein allow for the full use of the footpads/deck without interference due to portions of the suspension system extending above or disposed on the top surface of the board.

No known system or device can perform these functions. However, not all embodiments and examples described herein provide the same advantages or the same degree of advantage Conclusion The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A suspension system for a self-balancing electric vehicle, the suspension system comprising:
a swingarm coupling an axle of a wheel of the self-balancing electric vehicle to a frame of the self-balancing electric vehicle, such that the frame is configured to be movable up and down relative to the axle; and
a shock absorber oriented transverse to the direction of travel of the self-balancing electric vehicle and coupled at each end to the swingarm, such that the shock absorber is configured to dampen up and down movement of the frame relative to the axle;
wherein an entirety of the shock absorber is disposed below a foot-receiving deck portion of the self-balancing electric vehicle.

2. The suspension system of claim 1, wherein the shock absorber is coupled at each end to the swingarm by a respective bell crank.

3. The suspension system of claim 2, wherein the bell cranks are disposed entirely below the foot-receiving deck portion.

4. The suspension system of claim 1, wherein the shock absorber is coupled at each end to the swingarm by a respective bell crank, and the bell cranks are each coupled to the swingarm by a respective push rod.

5. The suspension system of claim 1, wherein a cross member of the swingarm is pivotably connected to the frame.

6. The suspension system of claim 1, wherein legs of the swingarm are fixed at distal ends to respective end portions of the axle.

7. The suspension system of claim 6, wherein each leg of the swingarm forms a first class lever with a force applied at the axle and a load disposed at a push rod coupling the swingarm to the shock absorber.

8. The suspension system of claim 7, wherein a cross member of the swingarm is pivotably coupled to the frame and forms a fulcrum of the first class lever.

9. The suspension system of claim 1, wherein the frame is coupled to the axle by only the suspension system.

10. The suspension system of claim 1, wherein the shock absorber is coupled at each end to the swingarm by a respective bell crank, and each of the bell cranks is coupled to the board at a respective fixed pivot joint.

11. The suspension system of claim 10, wherein each of the bell cranks has a first floating pivot joint rotatably coupled to a respective end of the shock absorber and a second floating pivot joint rotatably coupled to a respective pushrod, each pushrod connecting the respective bell crank to the swingarm.

12. A method of operating a self-balancing electric vehicle, the method comprising:
damping up and down movement of a frame of the self-balancing electric vehicle relative to an axle of the self-balancing electric vehicle using a suspension system coupling the axle to the frame, wherein the suspension system includes a shock absorber oriented transverse to a direction of travel, and wherein an entirety of the shock absorber is disposed below a foot-receiving deck portion of the electric vehicle.

13. The method of claim 12, wherein the suspension system further comprises:
- a swingarm pivotable about a fulcrum coupled to the frame, the swingarm including at least one leg coupled to the axle; and
- a first bell crank spaced from a second bell crank, wherein each of the bell cranks is coupled (a) to the frame at a respective fixed pivot joint, (b) to the shock absorber at a first floating pivot joint, and (c) to a respective push rod at a second floating pivot joint, such that each of the bell cranks is connected to the swingarm by the respective push rod.

14. The method of claim 13, wherein the swingarm is coupled to the axle on an opposite side of the fulcrum with respect to the push rods, forming a first class lever.

15. The method of claim 14, wherein the fulcrum comprises a cross member of the swingarm pivotably connected to the frame.

16. The method of claim 14, wherein the at least one leg of the swingarm includes a first leg and a second leg, wherein the first and second legs are fixed at distal ends to respective end portions of the axle.

17. The method of claim 13, wherein the bell cranks are disposed entirely below the foot-receiving deck portion.

18. The method of claim 12, wherein the frame is coupled to the axle by only the suspension system.

19. A suspension system for a self-balancing electric vehicle, the suspension system comprising:
- a swingarm coupling an axle of the self-balancing electric vehicle to a frame of the self-balancing electric vehicle, such that the frame is movable up and down relative to the axle; and
- a shock absorber oriented transverse to the direction of travel of the self-balancing electric vehicle, such that the shock absorber is configured to dampen up and down movement of the frame relative to the axle;
- wherein an entirety of the shock absorber is disposed below a foot-receiving deck portion of the self-balancing electric vehicle.

20. The suspension system of claim 19, wherein the shock absorber is coupled at each end to the swingarm by a respective pivoting mechanical linkage.

* * * * *